(12) United States Patent
Kumar

(10) Patent No.: US 10,256,935 B1
(45) Date of Patent: Apr. 9, 2019

(54) ADAPTIVE FLEXIBLE GRID IN AN OPTICAL NETWORK

(71) Applicant: FUJITSU LIMITED, Kawasaki-Shi, Kanagawa (JP)

(72) Inventor: Arvind Kumar, Karnal (IN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/906,579

(22) Filed: Feb. 27, 2018

(51) Int. Cl.
| | |
|---|---|
| *H04L 1/00* | (2006.01) |
| *H04B 10/27* | (2013.01) |
| *H04B 10/40* | (2013.01) |
| *H04B 10/50* | (2013.01) |
| *H04B 10/60* | (2013.01) |
| *H04J 14/02* | (2006.01) |
| *H04B 10/516* | (2013.01) |

(52) U.S. Cl.
CPC .......... *H04J 14/0213* (2013.01); *H04B 10/27* (2013.01); *H04B 10/40* (2013.01); *H04B 10/516* (2013.01); *H04L 1/0003* (2013.01); *H04L 1/0041* (2013.01); *H04L 1/0057* (2013.01); *H04B 10/50* (2013.01); *H04B 10/60* (2013.01); *H04J 14/021* (2013.01)

(58) Field of Classification Search
None
See application file for complete search history.

(56) References Cited

U.S. PATENT DOCUMENTS

| | | | | |
|---|---|---|---|---|
| 9,231,721 | B1* | 1/2016 | Varadarajan | .......... H04J 3/1652 |
| 2013/0101292 | A1* | 4/2013 | Lanzone | ................. H04L 47/25 |
| | | | | 398/66 |
| 2014/0193148 | A1* | 7/2014 | Dahlfort | ............ H04B 10/0775 |
| | | | | 398/34 |
| 2015/0117860 | A1* | 4/2015 | Braun | ................. H04J 14/0282 |
| | | | | 14/282 |
| 2017/0214488 | A1* | 7/2017 | Vassilieva | .............. H04B 10/50 |

* cited by examiner

*Primary Examiner* — Darren E Wolf
(74) *Attorney, Agent, or Firm* — Baker Botts L.L.P.

(57) ABSTRACT

A disclosed method for optimizing channel selection in a flexible grid of an optical network may be used to select a minimum number of channels to allocate to traffic between pairs of optical transponders at a particular distance based on the modulation format and the FEC mechanism used. The method may include selecting an initial number of channels to allocate to the traffic, tuning the modulation format for the traffic while potentially reducing the number of channels, and tuning the FEC mechanism for the traffic while potentially further reducing the number of channels. The transponders may support multiple modulation formats of different orders and an adaptive FEC mechanism for which the maximum number of FEC overhead bytes is equal to the number of bytes in the transmitted data packets. The method may be implemented by an SDN controller and may be dependent on a feedback mechanism between the optical transponders.

20 Claims, 10 Drawing Sheets

ADAPTIVE FLEXIBLE GRID IN AN OPTICAL NETWORK

BACKGROUND

Field of the Disclosure

The present disclosure relates generally to optical communication networks and, more particularly, to systems and methods for the control and configuration of an adaptive flexible grid in an optical network.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM). Optical networks may also include various optical elements, such as amplifiers, dispersion compensators, multiplexer/demultiplexer filters, wavelength selective switches (WSS), optical switches, couplers, etc. to perform various operations within the network.

Software-defined networking (SDN) represents an important step towards network virtualization and abstraction and may allow for a logical network entity to be instantiated automatically using software instructions, rather than manually from user input. In this manner, SDN may enable flexible definition of virtual networks. For example, SDN may enable a traffic flow entity to be instantiated using an arbitrary combination of layer identifiers defined in a header space, such as using various combinations of traffic identifiers (Internet-protocol (IP) addresses, media access controller (MAC) addresses, port addresses, etc.) at various layers to define a traffic flow. Then, by installing and configuring packet-forwarding rules associated with the traffic flow to physical switches, an SDN controller may ensure that the traffic flow entity instantiates a path that is routed through a network including the physical switches.

SUMMARY

In one aspect, a method for controlling and configuring an adaptive flexible grid in an optical network is disclosed. The method may include determining a first number of channels in the flexible grid to allocate to traffic between a transmitter in the optical network and a receiver in the optical network using a first modulation format selected for the traffic and including zero forward error correction (FEC) overhead bytes in packets transmitted between the transmitter and the receiver, configuring the transmitter to allocate the first number of channels in the flexible grid to the traffic between the transmitter and the receiver and to transmit packets to the receiver using the first modulation format and zero FEC overhead bytes, and determining a second number of channels in the flexible grid to allocate to the traffic between the transmitter and the receiver, the second number of channels being less than the first number of channels. Determining the second number of channels may include selecting a second modulation format for the traffic, the second modulation format being of a higher order than the first modulation format, selecting a first non-zero number of FEC overhead bytes to be included in packets transmitted between the transmitter and the receiver, and determining a minimum number of channels for which transmission of packets between the transmitter and receiver using the second modulation format and the first non-zero number of FEC overhead bytes meets a predetermined performance measure. The method may include re-configuring the transmitter to allocate the second number of channels in the flexible grid to the traffic between the transmitter and the receiver and to transmit packets to the receiver using the second modulation format and including the first non-zero number of FEC overhead bytes.

In any of the disclosed embodiments, the method further may further include selecting the first modulation format. At least one of selecting the first modulation format and determining the first number of channels may be dependent on the distance between the transmitter and the receiver.

In any of the disclosed embodiments, selecting the second modulation format for the traffic may include, for at least one modulation format of a higher order than the first modulation format, re-configuring the transmitter to allocate a number of channels less than the first number of channels and to transmit packets to the receiver using the modulation format of a higher order than the first modulation format, transmitting a packet from the transmitter to the receiver, and determining whether the transmitted packet was received by the receiver without errors.

In any of the disclosed embodiments, selecting the first non-zero number of FEC overhead bytes may include, for at least one non-zero number of FEC overhead bytes, re-configuring the transmitter to include the non-zero number of FEC overhead bytes in packets transmitted to the receiver, transmitting a packet from the transmitter to the receiver, and determining whether the transmitted packet was received by the receiver without errors.

In any of the disclosed embodiments, determining the minimum number of channels for which transmission of packets between the transmitter and receiver meets a predetermined performance measure may include, for at least one number of channels less than the first number of channels, re-configuring the transmitter to allocate the number of channels less than the first number of channels, transmitting a packet from the transmitter to the receiver, and determining whether the transmitted packet was received by the receiver without errors.

In any of the disclosed embodiments, each channel to be allocated to the traffic between the transmitter and the receiver may include a minimum sized slice of available spectral bandwidth in the optical network.

In any of the disclosed embodiments, the minimum sized slice of available spectral bandwidth in the optical network may be less than or equal to 6.25 GHz.

In any of the disclosed embodiments, the FEC overhead bytes may include FEC overhead bytes of a Reed-Solomon error-correcting code.

In another aspect, a system for implementing an adaptive flexible grid in a software-defined network (SDN) for optical transport is disclosed. The system may include a plurality of optical transponders, and an SDN controller. The SDN controller may include a memory media and a processor having access to the memory media. The memory media may store instructions executable by the processor for determining a first number of channels in the flexible grid to allocate to traffic between a first transponder in the optical network and a second transponder in the optical network using a first modulation format selected for the traffic and including zero forward error correction (FEC) overhead bytes in packets transmitted between the first transponder and the second transponder, configuring the first transponder to allocate the first number of channels in the flexible grid to the traffic between the first transponder and the second transponder and to transmit packets to the second transponder using the first modulation format and zero FEC overhead bytes, and determining a second number of channels in the flexible grid to allocate to the traffic between the first transponder and the second transponder, the second number of channels being less than the first number of channels. Determining the second number of channels may include selecting a second modulation format for the traffic, the second modulation format being of a higher order than the first modulation format, selecting a first non-zero number of FEC overhead bytes to be included in packets transmitted between the first transponder and the second transponder, and determining a minimum number of channels for which transmission of packets between the first transponder and the second transponder using the second modulation format and the first non-zero number of FEC overhead bytes meets a predetermined performance measure. The memory media may store instructions executable by the processor for re-configuring the first transponder to allocate the second number of channels in the flexible grid to the traffic between the first transponder and the second transponder and to transmit packets to the second transponder using the second modulation format and including the first non-zero number of FEC overhead bytes.

In any of the disclosed embodiments, the memory media may further store instructions executable by the processor for selecting the first modulation format. At least one of selecting the first modulation format and determining the first number of channels may be dependent on the distance between the first transponder and the second transponder.

In any of the disclosed embodiments, each of the first and second transponders may be configured to support at least three modulation formats, including the first modulation format and the second modulation format.

In any of the disclosed embodiments, each of the first and second transponders may be configured to support the inclusion of any of a plurality of non-zero numbers of FEC overhead bytes in packets transmitted by the transponder, including the first non-zero number of FEC overhead bytes and a maximum number of FEC overhead bytes equal to the number of data bytes in packets transmitted by the transponder.

In any of the disclosed embodiments, each channel to be allocated to the traffic between the first transponder and the second transponder may include a minimum sized slice of available spectral bandwidth in the optical network.

In any of the disclosed embodiments, the first and second transponders may be configured to communicate control information to each other according to a handshake protocol, the control information being communicated using control overhead bytes included in one or more packets exchanged between the first and second transponders or using an out-of-band channel for communicating control information in the optical network.

In any of the disclosed embodiments, the SDN controller may reside in a control plane of the optical network. To configure the first transponder to allocate the first number of channels in the flexible grid to the traffic between the first transponder and the second transponder and to transmit packets to the second transponder using the first modulation format and zero FEC overhead bytes, the SDN controller may be configured to communicate first configuration information to the first transponder. The first configuration information may include information indicating the first number of channels and the first modulation format and information indicating that forward error correction is to be disabled. To re-configure the first transponder to allocate the second number of channels in the flexible grid to the traffic between the first transponder and the second transponder and to transmit packets to the second transponder using the second modulation format and including the first non-zero number of FEC overhead bytes, the SDN controller may be configured to communicate second configuration information to the first transponder. The second configuration information may include information indicating the second number of channels and the second modulation format, and information indicating that forward error correction is to be enabled and configured to include the first non-zero number of FEC overhead bytes in packets transmitted to the second transponder.

In yet another aspect, an optical transponder is disclosed. The optical transponder may include first circuitry to support at least three modulation formats, second circuitry to support the inclusion of any of a plurality of non-zero numbers of forward error correction (FEC) overhead bytes in packets transmitted by the optical transponder, including a maximum number of FEC overhead bytes equal to the number of data bytes in packets transmitted by the optical transponder, third circuitry to transmit packets to another optical transponder over one or more channels in a flexible grid in an optical network, and fourth circuitry to receive first configuration information and to receive second configuration information. The first configuration information may include information indicating a first number of channels in the flexible grid to allocate to traffic between the optical transponder and the other optical transponder, information indicating a first modulation format with which packets are to be transmitted from the optical transponder to the other optical transponder, and information indicating that forward error correction is to be disabled for packets transmitted from the optical transponder to the other optical transponder. The second configuration information may include information indicating a second number of channels in the flexible grid to allocate to traffic between the optical transponder and the other optical transponder, the second number of channels being less than the first number of channels, information indicating a second modulation format with which packets are to be transmitted from the optical transponder to the other optical transponder, the second modulation format being of a higher order than the first modulation format, and information indicating that forward error correction is to be enabled and configured to include a first non-zero number of FEC overhead bytes in packets transmitted from the optical transponder to the other optical transponder. The optical transponder may further include fifth circuitry to configure the optical transponder to transmit packets to the other optical transponder in accordance with the first configuration information responsive to receipt of the first configuration information, and to re-configure the optical transponder to transmit packets to the other optical transponder in accordance with the second configuration information responsive to receipt of the second configuration information.

In any of the disclosed embodiments, the transponder may further include sixth circuitry to communicate first control information to the other optical transponder in accordance with a handshake protocol, the first control information being communicated using control overhead bytes included in one or more packets transmitted from the optical transponder to the other optical transponder or using an out-of-band communication channel for control information in the optical network. The first control information may indicate at least one of the number of channels over which the optical transponder is configured to transmit packets to the other optical transponder, the modulation format with which packets are to be transmitted from the optical transponder to the other optical transponder, and the number of FEC overhead bytes to be included in packets transmitted from the optical transponder to the other optical transponder.

In any of the disclosed embodiments, the transponder may further include seventh circuitry to receive feedback information from the other optical transponder in accordance with the handshake protocol, the feedback information indicating whether or not packets received by the other optical transponder were received without errors.

In any of the disclosed embodiments, the optical network may include a software-defined network (SDN) for optical transport, and the fourth circuitry may be configured to receive the first configuration information and the second configuration information from an SDN controller residing in a control plane of the optical network.

In any of the disclosed embodiments, the transponder may further include sixth circuitry to communicate second control information to the SDN controller indicating whether or not packets received by the other optical transponder were received without errors, the second control information being dependent on the feedback information received from the other optical transponder.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
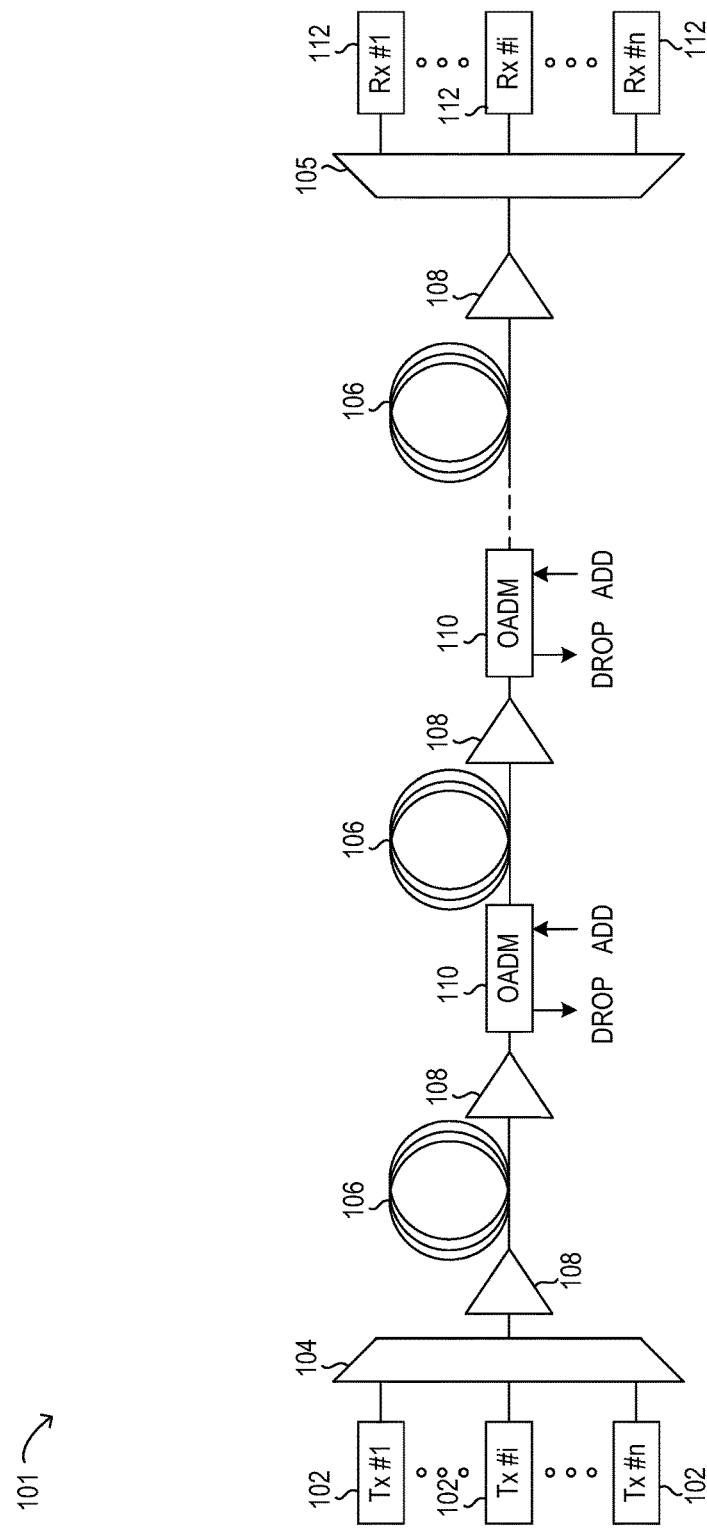
FIG. 1 is a block diagram of selected elements of an embodiment of an optical network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Optical networks are increasingly being used in applications involving a low cost, yet high data rate for optimal performance and economic feasibility. As data rates for optical networks continue to increase, the demands on optical signal-to-noise ratios (OSNR) also increase, for example, due to the use of advanced modulation formats, such as QAM and PSK with dual polarization. In particular, noise accumulations resulting from cascading of optical amplifiers in an optical network operating at very high data rates may limit the reach of an optical signal at a desired level of OSNR.

The efficient use of network resources is always a concern of network operators, who face strong pressure to reduce the per unit bandwidth cost as well as network power consumption. However, network utilization efficiency in existing wavelength-routed optical networks is limited due to their rigid nature. One such limitation may arise from a mismatch of granularities between the client layer, which may support a broad range of capacity demands with granularities of several gigabits per second to 100 Gb/s or more, and the physical wavelength layer, which may implement a fixed, and relatively large, granularity of wavelength, or a very small number of relatively large granularity options for wavelength. For example, when the end-to-end client traffic is not sufficient to fill the entire capacity of a wavelength, residual bandwidth of that wavelength is wasted. This is sometimes referred to as the "stranded bandwidth" issue.

As will be disclosed in further detail, a method for optimizing channel selection in a flexible grid of an optical network may be used to select a minimum number of channels to allocate to traffic between pairs of optical transponders at a particular distance in the optical network based on the modulation format used for the traffic and the forward error correction (FEC) mechanism used for the traffic. The method may include selecting an initial number of channels to allocate to the traffic based on an initial modulation format selected for the traffic and no forward error correction, tuning the modulation format for the traffic while potentially reducing the number of channels, and tuning the FEC mechanism for the traffic while potentially further reducing the number of channels. The transponders may support multiple modulation formats of different orders and an adaptive FEC mechanism for which the maximum number of FEC overhead bytes may be any number up to, and including, the number of bytes in the transmitted data packets. The method may be implemented by an SDN controller and may be dependent on a feedback mechanism between the optical transponders.

Referring now to the drawings, FIG. 1 illustrates an example embodiment of optical network 101, which may represent an optical communication system. Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

Optical network 101 may include one or more optical fibers 106 to transport one or more optical signals communicated by components of optical network 101. The network elements of optical network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical network 101 may comprise a point-to-point optical network with terminal nodes, a ring optical network, a mesh optical network, or any other suitable optical network or combination of optical networks. Optical network 101 may be used in a short-haul metropolitan network, a long-haul inter-city network, or any other suitable network or combination of networks. The capacity of optical network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a Single-Mode Fiber (SMF), Enhanced Large Effective Area Fiber (E-LEAF), or TrueWave® Reduced Slope (TW-RS) fiber.

To increase the information capacity and transport capabilities of optical network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical network 101 may transmit disparate channels using WDM or some other suitable multi-channel multiplexing technique, and to amplify the multi-channel signal.

Optical network 101 may include one or more optical transmitters (Tx) 102 to transmit optical signals through optical network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical network 101. In some embodiments, optical transmitter 102 may be used to determine the baud rate for the data to be transmitted during the optical modulation. An example of transmitter 102 for applying different baud rates is an adaptive rate transponder. Additionally, a forward error correction module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical network 101. Optical amplifiers 108 may be positioned before or after certain lengths of fiber 106. Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of an optical pump to excite the atoms of the doped portion of the optical fiber, which increases the intensity of the optical signal. As an example, optical amplifiers 108 may comprise an erbium-doped fiber amplifier (EDFA).

OADMs 110 may be coupled to optical network 101 via fibers 106. OADMs 110 comprise an add/drop module, which may include a system, apparatus or device to add and drop optical signals (for example at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans. In one example, the distance between a transmitter and a destination receiver might be 1000 kilometers, and an optical signal traveling along fibers 106 from the transmitter to the receiver might pass through 100 or more ROADM devices before reaching its destination.

In certain embodiments of optical network 101, each OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical network 101 may include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical network 101 may include receivers 112 coupled to demultiplexer 105. Each receiver 112 may receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

As noted above, optical networks, such as optical network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

In an optical network, such as optical network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, and an operational support system (OSS) which handles network-wide operations.

Modifications, additions or omissions may be made to optical network 101 without departing from the scope of the disclosure. For example, optical network 101 may include more or fewer elements than those depicted in FIG. 1. Also, as mentioned above, although depicted as a point-to-point network, optical network 101 may comprise any suitable network topology for transmitting optical signals such as a ring, a mesh, and a hierarchical network topology. In operation of optical transport network 101, each of transmitters 102 and receivers 112 may be enabled to implement two or more modulation formats.

The amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical network 101.

A traditional ROADM network typically implements fixed grids with grid bandwidth at 50 GHz and 100 GHz boundaries, as defined by the ITU standard. When using these fixed channels, bandwidth can be wasted if the traffic using one of these channels does not require as much as 50 GHz or 100 GHz spacing. For example a 40 Gb/s channel for traffic being transmitted using QPSK might not need a 100 GHz channel when transmitting the data over a short distance. In this example, a single channel at 70 GHz spacing might be sufficient. Using two channels of 50 GHz each, as would be required under the ITU standard, 30 GHz of otherwise available spectral bandwidth would be wasted.

In some embodiments of the present disclosure, coherent select technology may be used to tune a flexible grid for a wider range of wavelengths from the C-Band, with the flexibility to use any size grid in the available spectral bandwidth. With coherent select technology, all the wavelengths may be sent in all directions without using active WSS devices that work on a fixed ITU standard grid. Instead, passive devices may be used. In coherent select technology, it is the responsibility of receiver to select the desired wavelength. Achieving this functionality may require a strong layer zero control plan controlling the wavelengths at transmitters and receivers over the entire network span. In some example embodiments, in order to optimize the use of available spectral bandwidth, the entire C-Band may be divided into multiple channels of 6.25 GHz granularity, which is the minimum sized slice of the spectral bandwidth, in this example. Subsequently, depending upon the exact need, the number of these channels to be allocated to traffic between two peers in the optical network may be selected in a manner that avoids wasting bandwidth.

The systems and methods described herein for controlling and configuring an adaptive flexible grid in an optical network may address multiple problems faced in conventional optical grid networks. For example, channels or grids are precious commodities in any network. By choosing the number of channels in a grid for a particular type of channel with a specific modulation format, a particular distance (or reach) can be achieved without enabling FEC overhead bytes. To achieve a longer distance (i.e., to increase the reach), either the number of channels might be increased or FEC overhead bytes might be added. However, there is a penalty on the data rate if forward error correction is enabled that depends upon the number FEC overhead bytes that are added to the data. In other words, there is direct relationship between the number of channels used in a flexible grid and the extra overhead bytes used for forward error correction.

In some embodiments of the present disclosure, higher modulation formats may be used to compress the information for a specific data rate channel and use fewer channels in a grid. For example, for the same data rate 16-QAM carries approximately twice the number of bits per symbol than does QPSK, therefore requiring half the symbol rate and, consequently, half the spectral bandwidth. Similarly, 64-QAM carries three times the number of bits per symbol than does QPSK, and requires one third the spectral bandwidth. Thus, spectral bandwidth can be saved by reducing the symbol rate and increasing the number of bits per symbol to transmit the same data rate. In some cases, however, when using higher order (or maximum order) modulation formats and no FEC overhead bytes, a receiver might not receive all of the transmitted symbols. For example, since higher-level bit loading decreases the distance between the two closest constellation points, 16-QAM and 64-QAM formats suffer from signal-to-noise penalties per bit of 4 dB and 8.5 dB, respectively, when compared with QPSK.

In some embodiments, by using a combination of modulation formats supported on the transponder along with an adaptive FEC algorithm, an optimal number of channels may be selected from the grid for a specific span length. Unlike in some existing adaptive FEC algorithms, which are limited to adjusting the number of FEC overhead bytes from 0 to 16 bytes for a 255 block OTN frame, the adaptive FEC techniques described herein may provide greater flexibility in the selection of the number of FEC overhead bytes. In certain embodiments, the techniques described herein may be used to select the bare minimum number of channels for a given span between two peers/transponders or for each of multiple pairs of peers/transponders, resulting in a more efficient use of the entire spectral bandwidth. In addition, because the disclosed techniques provide means to more efficiently use the DWDM spectrum by tuning FEC parameters and modulation formats, they also provide additional flexibility in choosing the number of grids in the spectrum to achieve the optimum reach of various signals in the spectrum.

Figure 2:
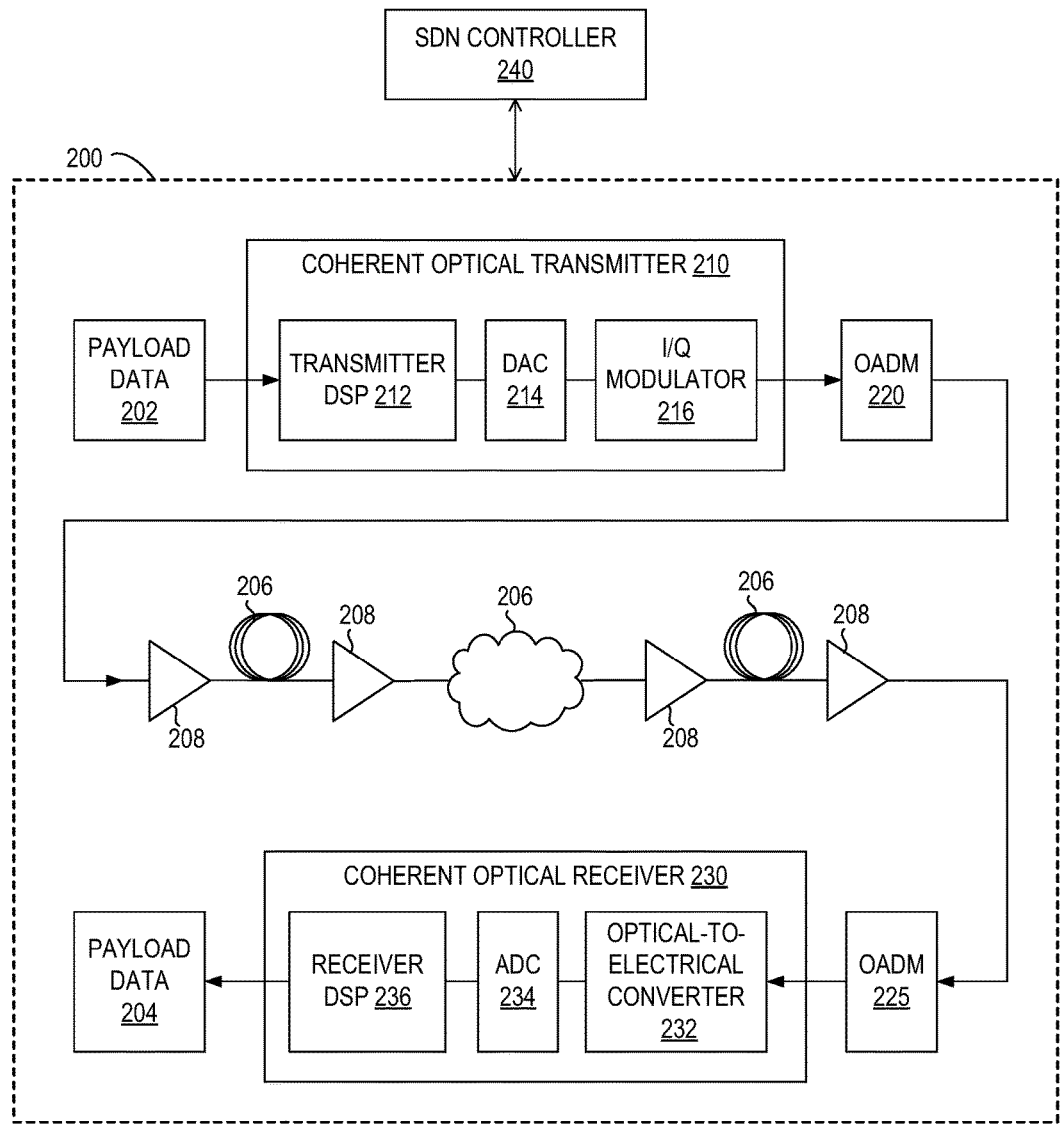
FIG. 2 is a block diagram of selected elements of an embodiment of an optical network.

FIG. 2 is a block diagram of selected elements of an example embodiment of an optical network 200. In this example embodiment, optical network 200 is a software-defined network (SDN) for optical transport. Optical network 200 may include, or be communicatively coupled to, SDN controller 240, which may communicate with each of the devices and/or other elements of optical network 200. In some embodiments, SDN controller 240 may be similar to SDN controller 930 illustrated in FIG. 9 and described below. For example, SDN controller may include a software controller 920 configured to provide configuration and control information to one or more of the devices and/or other elements of optical network 200 to allow a logical network entity to be instantiated automatically using software instructions, rather than manually based on user input, thus enabling the flexible definition of virtual networks.

In the example embodiment illustrated in FIG. 2, optical network 200 includes two optical transponders that communicate with each other over fibers 206 (which may be similar to fibers 106 illustrated in FIG. 1 and described above). A first one of the transponders is shown as coherent optical transmitter 210 and a second one of the transponders is shown as coherent optical receiver 230. However, each of these transponders may include all of the elements and functionality of both a coherent optical transmitter and a coherent optical receiver. In this example, payload data 202 is provided to coherent optical transmitter 210 for processing and transmission as an optical signal over fibers 206, and coherent optical receiver 230 receives an optical signal over fibers 206 and processes it to reconstruct transmitted payload data 202 as received payload data 204.

Coherent optical transmitter 210 includes, among other elements, transmitter digital signal processor (DSP) 212, digital-to-analog converter (DAC) 214, and quadrature (I/Q) modulator 216 that collectively convert payload data 202 into an optical signal for transmission over fibers 206. Coherent optical receiver 230 includes, among other elements, receiver DSP 236, analog-to-digital converter (ADC) 234, and optical-to-electrical converter 232 that collectively convert a received optical signal into payload data 204.

Optical network 200 also includes OADMs 220 and 225, which may be similar to OADMs 110 illustrated in FIG. 1 and described above, and multiple optical amplifiers 208, which may be similar to optical amplifiers 108 illustrated in FIG. 1 and described above. As described in more detail below, SDN controller 240 may include an adaptive flexible grid controller 930 for configuring a flexible grid in optical network 200, including selecting a minimum number of channels to allocate to traffic between two peers in the network (e.g., between coherent optical transmitter 210 and coherent optical receiver 230) based on a tuning of the modulation format for the traffic and a tuning of the number of forward error correction overhead bytes included in packets transmitted between the two peers. In some embodiments, SDN controller may be similar to SDN controller 900 illustrated in FIG. 9 and described below.

In certain embodiments, pairs of peers in an optical network (e.g., a pair of optical transponders such as coherent optical transmitter 210 and coherent optical receiver 230) may be configured to communicate control information to each other according to a predetermined handshake protocol. In one example in which FEC overhead bytes are enabled for correcting errors, the control information may be communicated in accordance with the handshake protocol using control overhead bytes (e.g., general communication channel bytes, such as GCC0 bytes) included in one or more packets exchanged between the optical transponders. In another example, the control information may be communicated in accordance with the handshake protocol using another type of out-of-band channel for communicating control information in the optical network, such as an optical supervisory channel (OSC). In certain embodiments, the handshake protocol may be used to return performance feedback from a receiving optical transponder (e.g., coherent optical receiver 230) to a transmitting optical transponder (e.g., coherent optical transmitter 210). In certain embodiments, the handshake protocol may be used by a transmitting optical transponder (e.g., coherent optical transmitter 210) to communicate clock synchronization information due to the inclusion of extra FEC overhead bytes to a receiving optical transponder (e.g., coherent optical receiver 230). For example, the inclusion of extra FEC overhead bytes changes the data rate for the traffic between the two optical transponders.

In certain embodiments, the number of FEC overhead bytes supported in the optical networks described herein can vary from 0 bytes (in which case forward error correction is disabled) up to a maximum number of FEC overhead bytes that is equal to the number of data bytes in packets transmitted by the optical transponders. As described in more detail below, the optical transponders may be capable of adjusting the number of FEC overhead bytes based on a feedback mechanism between communicating pairs of optical transponders. For example, if the traffic between two optical transponders is communicated in 256-byte blocks of data, the optical transponder may be enabled to add up to 256 FEC overhead bytes to each packet. Similarly, if the traffic between two optical transponders is communicated in 1024-byte blocks of data, the optical transponder may be enables to add up to 1024 FEC overhead bytes to each packet, and so on. In certain embodiments, a proprietary frame format may be used to communicate the additional overhead bytes (e.g., FEC overhead bytes and/or GCC bytes), since anything over 16 additional FEC overhead bytes falls outside the standard optical frame formats. For example, according to the optical transport protocols typically used in DWDM communication, FEC overhead bytes are included in the defined optical frame format such that for every 239 bytes of payload data there are 16 bytes used as FEC overhead bytes.

In at least some embodiments, each of the optical transponders (such as coherent optical transmitter 210 and coherent optical receiver 230) may be enabled to implement two or more modulation formats. For example, each of the transponders may support two or more adaptive modulation formats including, but not limited to, FSK, ASK, BPSK, QPSK, 8-QAM, 16-QAM, 32-QAM, among others. In certain embodiments, an optical transponder may support up to 128 different modulation formats or more.

In certain embodiments, the techniques described herein may address the selection and allocation of a minimum number of channels for traffic between pairs of optical transponders by tuning both the modulation format and the FEC mechanism used for the traffic and reducing the number of channels accordingly.

Figure 3:
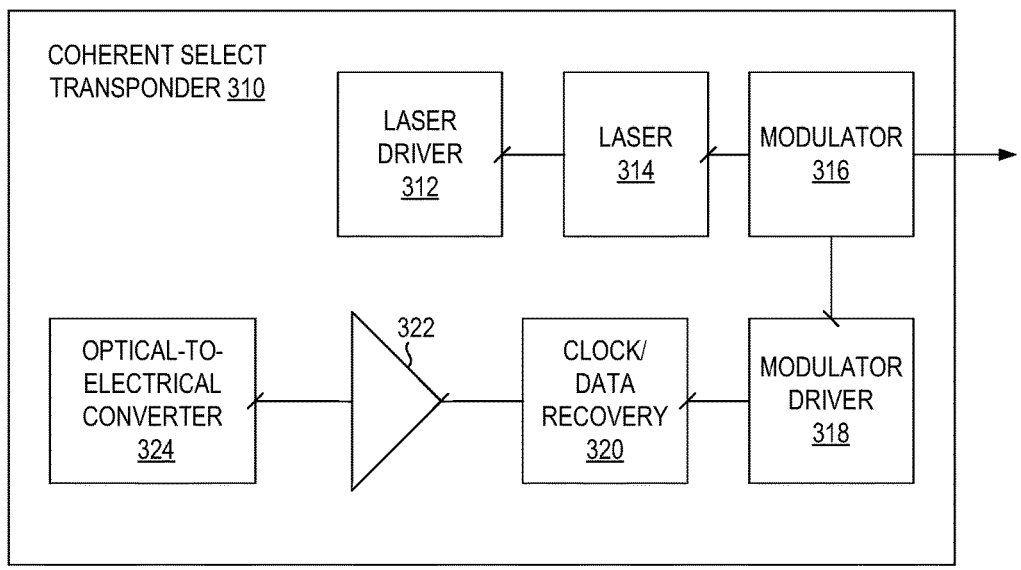
FIG. 3 is a block diagram of selected elements of an embodiment of a coherent select transponder.

FIG. 3 is a block diagram of selected elements of an example embodiment of an coherent select transponder 310. In this example embodiment, coherent select transponder 310 includes laser driver 312, laser 314, modulator 316, modulator driver 318, clock/data recovery 320, optical amplifier 322, and optical-to-electrical converter 324. In particular embodiments, each of the transponders in optical network 101 illustrated in FIG. 1 and/or in optical network 200 illustrated in FIG. 2 may include elements similar to those of coherent select transponder 310 illustrated in FIG. 3. For example, some or all of the elements of coherent select transponder 310 illustrated in FIG. 3 may be included in any of transmitters 102 and/or receivers 112 illustrated in FIG. 1, or in coherent optical transmitter 210 and/or coherent optical receiver 230 illustrated in FIG. 2.

In some embodiments of the present disclosure that use ROADM technologies, DWDM grids may be implemented at a minimum grid spacing of 6.25 GHz. By dividing the spectral bandwidth into these minimum sized slices of 6.25 GHz, the optical networks described herein may provide more flexibility in choosing spectrum bandwidth based upon traffic bandwidth and distance travelled than is possible in existing networks in which the minimum sized slices are larger than 6.25 GHz (e.g., 7.5 GHz, 12.5 GHz, 50 GHz, or 100 GHz). However, the techniques described herein are applicable in embodiments that implement a different minimum grid spacing (e.g., implementations with a minimum grid spacing that is larger or smaller than 6.25 Ghz). In certain embodiments, grid selection may be a function of the modulation format used, the span length, any non-linear impairments in the fiber and the FEC algorithm used (e.g., the number of FEC overhead bytes added).

In some existing optical networks that implement flexible grids, channels might be added in order to increase reach. However, in certain embodiments of the present disclosure, it might not be necessary to add channels (or to add as many channels) in order to increase reach due to a tuning of the modulation format and/or the FEC mechanism. In one example, for a span of X km length with a first modulation format, and using 10 Gb/s bandwidth, the number of 6.25 GHz slices selected for the traffic may be N. In this example, for a span of Y km length (where Y>X) for the same 10 Gb/s channel the number of 6.25 GHz slices selected for the traffic may M (where M>N). However, by applying the adaptive FEC techniques described herein, it may be possible to use the same number of slices (N) for the Y km span length if the number of FEC overhead bytes is increased.

In certain embodiments, the number of FEC overhead bytes B and modulation formats F may be varied for a given span length L exhibiting a specific non-linear effect. In one example, for a given span length, the modulation format may be changed from QPSK, in which case ten channels are selected, to 64-QAM, in which case the number of channels may be reduced to six. In this example, the number of slices may be further reduced by increasing the number of FEC overhead bytes.

In certain embodiments, Reed-Solomon error-correcting codes may be used to implement the adaptive FEC mechanism. Using Reed-Solomon codes, the number of bytes of error that can be detected may be equal to the number of FEC overhead bytes used and the number of bytes of error that can be corrected may be equal to half the number of FEC overhead bytes used. For example, if 16 FEC overhead bytes are used for every 239 bytes of payload data, up to 16 bytes of error can be detected and up to 8 bytes of error can be corrected within the 255 bytes of data. As the number of FEC overhead bytes increases, some additional challenges may be introduced. For example, when the number of FEC overhead bytes increases, the data rate at the transmitting optical transponder would change. This is in contrast to the optical transport protocols typically used in existing DWDM communication, in which the data rate does not change in this manner.

In certain embodiments, the techniques described herein for tuning the FEC mechanism and reducing the number of channels accordingly may avoid wasting channels due to adding more FEC overhead bytes than are needed to meet performance goals. In addition, the described techniques may avoid the introduction of cross talk caused by reducing the number of channels below the point at which performance goals can be met.

Figure 4:
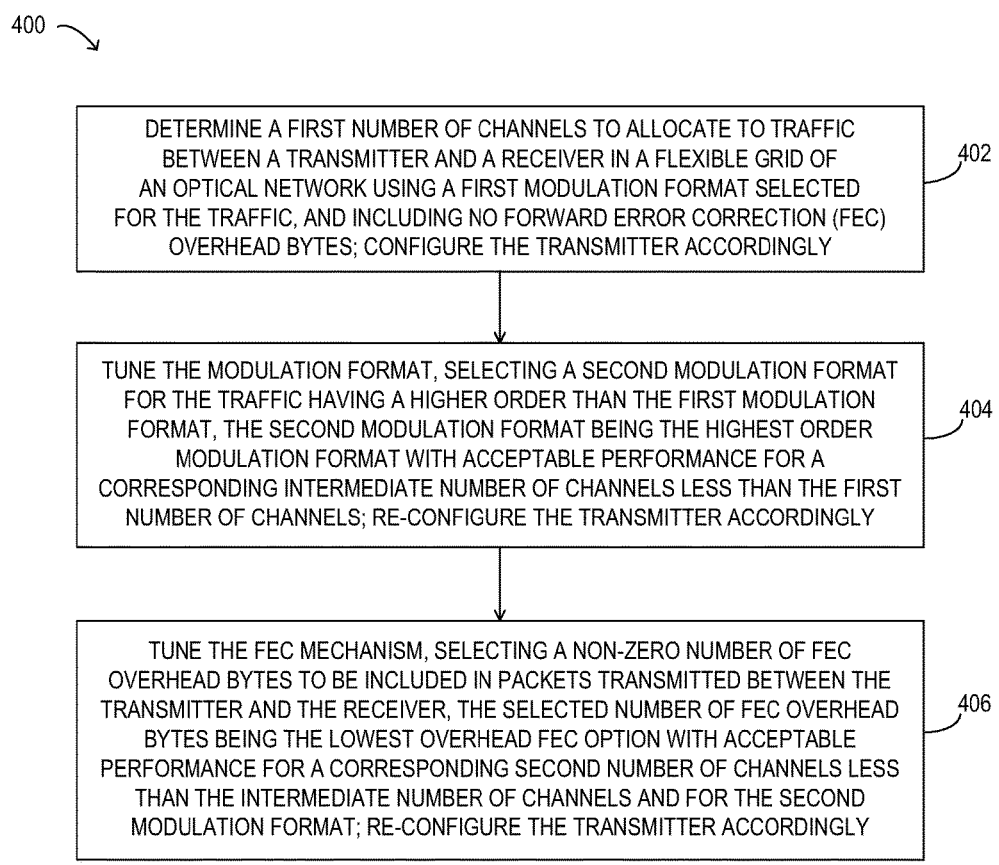
FIG. 4 is a flowchart of selected elements of an embodiment of a method for method for configuring a flexible grid in an optical network.

Referring now to FIG. 4, a block diagram of selected elements of an embodiment of method for configuring a flexible grid in an optical network is depicted in flowchart form. More specifically, FIG. 4 illustrates a method 400 for determining a minimum number of channels to be allocated between peers in an adaptive flexible grid, as described herein. At least certain operations in method 400 may be performed using an SDN controller, such as SDN controller 240 illustrated in FIG. 2 or SDN controller 900 (see also FIG. 9), based on performance feedback received from one or more transponders, such as coherent optical transmitter 210 and/or coherent optical receiver 230. For example, certain operations may be performed by adaptive flexible grid controller 930 executing on SDN controller 240 or SDN controller 900. It is noted that certain operations of method 400 illustrated in FIG. 4 may be optional or may be performed in a different order, in different embodiments.

Figure 6:
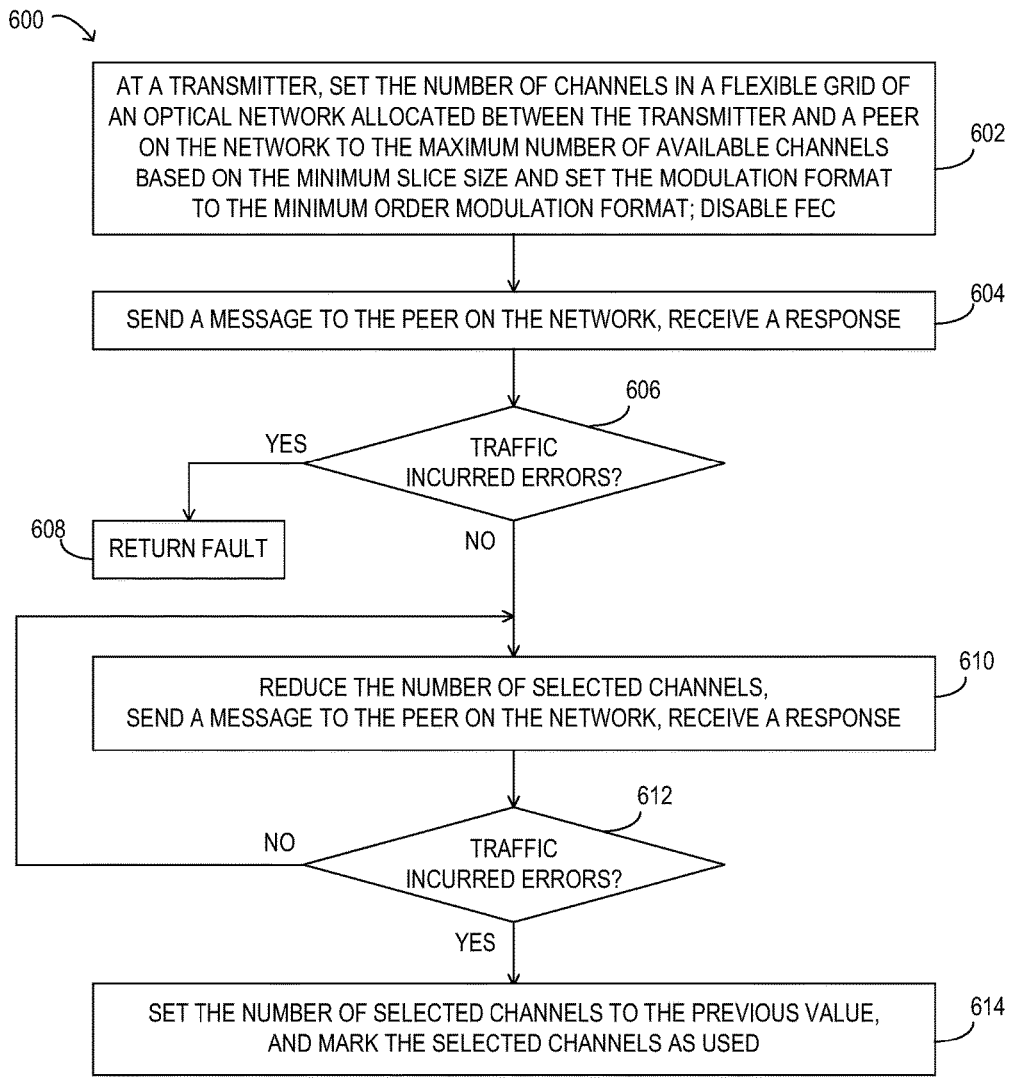
FIG. 6 is a flowchart of selected elements of an embodiment of a method for determining a first number of channels in a flexible grid to allocate to traffic between peers at a particular distance in an optical network.

Method 400 may begin at step 402 by determining a first number of channels to allocate to traffic between a transmitter and a receiver at a particular distance from the transmitter in a flexible grid of an optical network, the determination being dependent on a first modulation format selected for the traffic, and an assumption that no forward error correction (FEC) overhead bytes are included in the packets transmitted from the transmitter to the receiver. In some embodiments, the first modulation format selected for the traffic between the transmitter and receiver may be a minimum order modulation format supported by the transmitter. In some embodiments, the first number of channels may be a minimum number of channels for traffic between the transmitter and the receiver using the first modulation format that meets a predetermined performance measure. For example, the performance measure may be based on whether or not data packets transmitted from the transmitter to the receiver are received by the receiver with no errors. The selection of the first modulation format and/or the determination of the first number of channels may be dependent on the distance between the transmitter and the receiver. Once the first number of channels is determined, the transmitter may be configured to allocate the determined first number of channels to the traffic between the transmitter and receiver, to set the modulation format for the traffic between the transmitter and receiver to the selected first modulation format and to disable forward error correction format for the traffic between the transmitter and receiver by setting the number of FEC overhead bytes to zero. In certain embodiments, the determination of the first number of channels may be dependent on the minimum sized slice of the available spectral bandwidth in the optical network, with each channel corresponding to a minimum sized slice. One example method for determining the first number of channels in a flexible grid to allocate to traffic between peers at a particular distance in an optical network is illustrated in FIG. 6 and described below.

Figure 7:
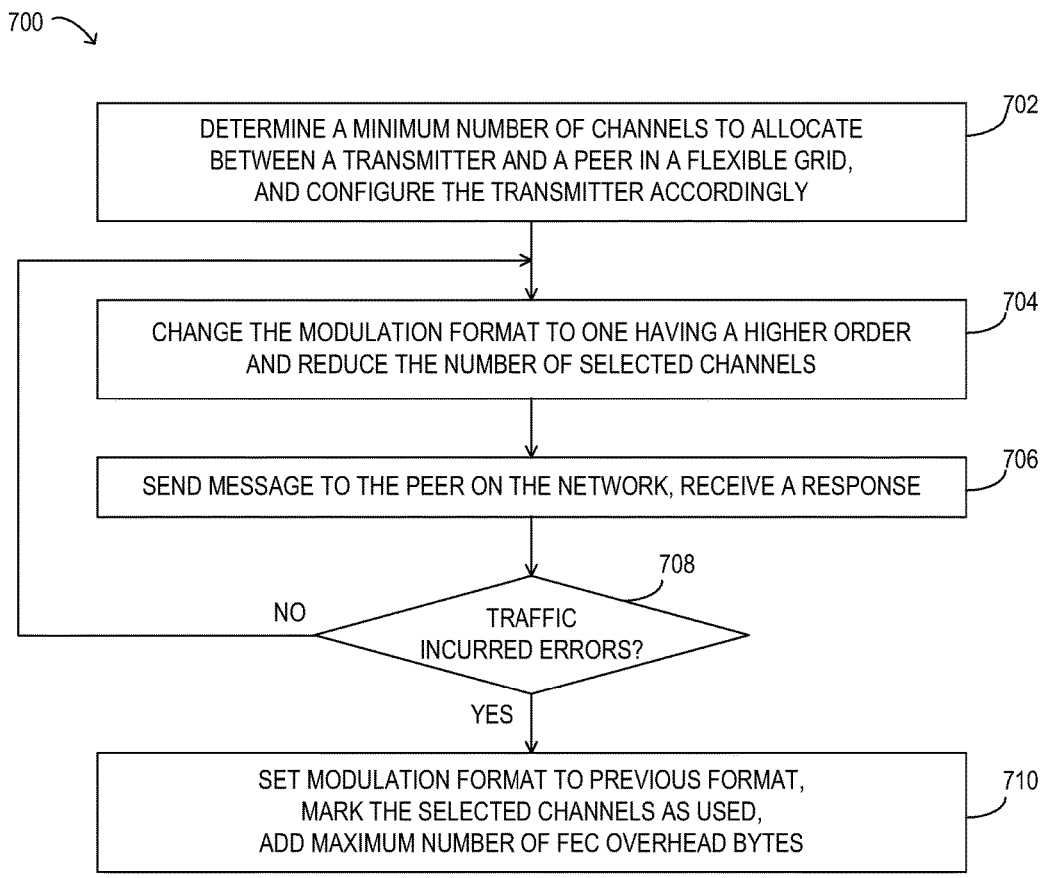
FIG. 7 is a flowchart of selected elements of an embodiment of a method for tuning the modulation format and potentially reducing the number of channels allocated to the traffic between peers at a particular distance in an optical network.

At step 404, the method may include tuning the modulation format, selecting a second modulation format for the traffic having a higher order than the first modulation format. The selected second modulation format may be the highest order modulation format supported by the transmitter with acceptable performance for a corresponding intermediate number of channels that is less than the first number of channels. For example, by changing the modulation format from the previously selected first modulation format (e.g., a minimum order modulation format) to a higher order modulation format, the spectral bandwidth required for the traffic between the transmitter and the receiver may be reduced. Once the second modulation format has been selected and the corresponding intermediate number of channels has been determined, the transmitter may be re-configured accordingly. For example, the transmitter may be configured to allocate the determined intermediate number of channels to the traffic between the transmitter and the receiver and to set the modulation format for the traffic between the transmitter and the receiver to the second modulation format. One example method for tuning the modulation format and potentially reducing the number of channels allocated to the traffic between peers at a particular distance in an optical network is illustrated in FIG. 7 and described below.

Figure 8A:
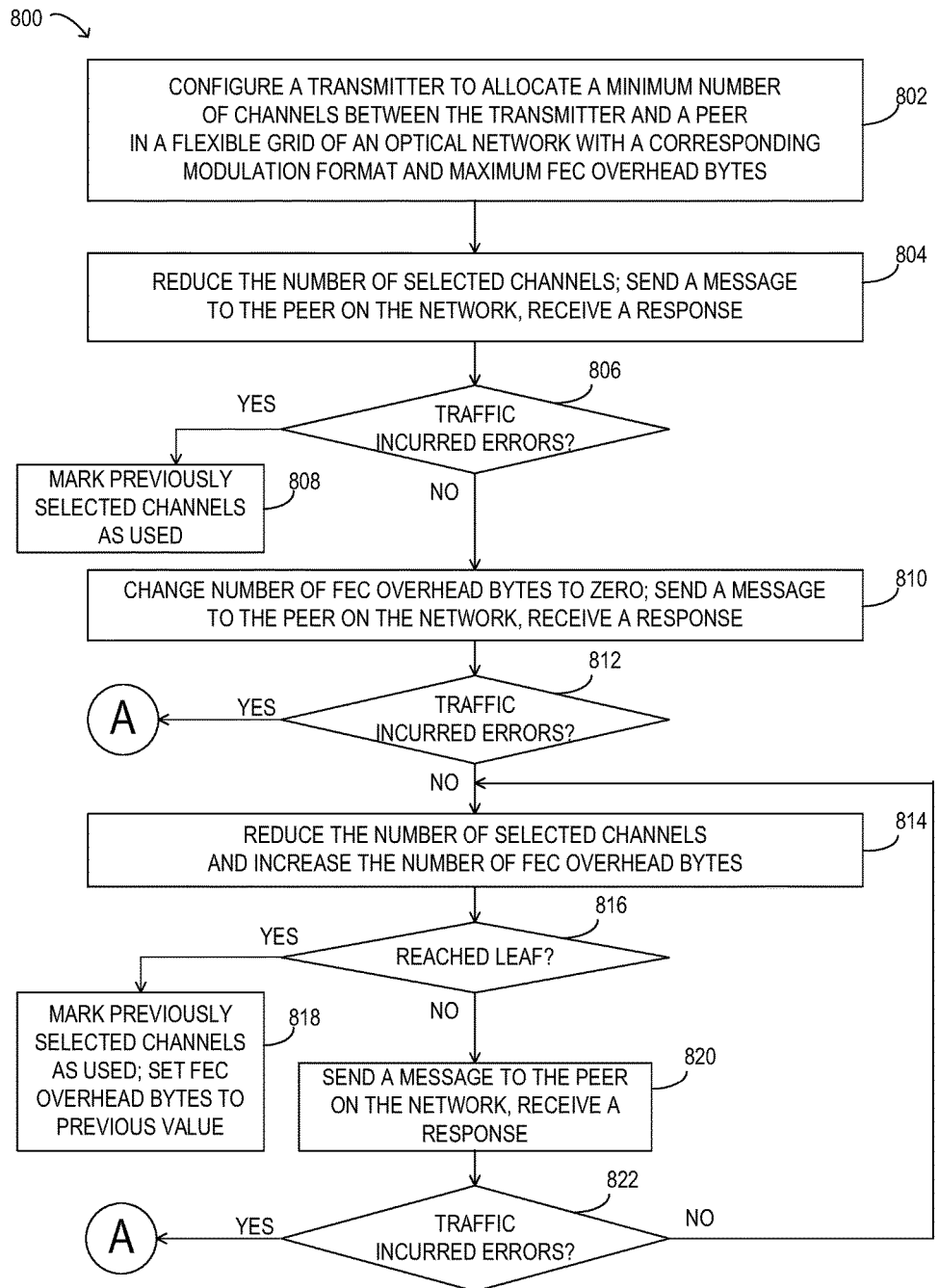
FIGS. 8A and 8B illustrate a flowchart of selected elements of an embodiment of a method for tuning the FEC mechanism and potentially reducing the number of channels allocated to traffic between peers at a particular distance in an optical network.
Figure 8B:
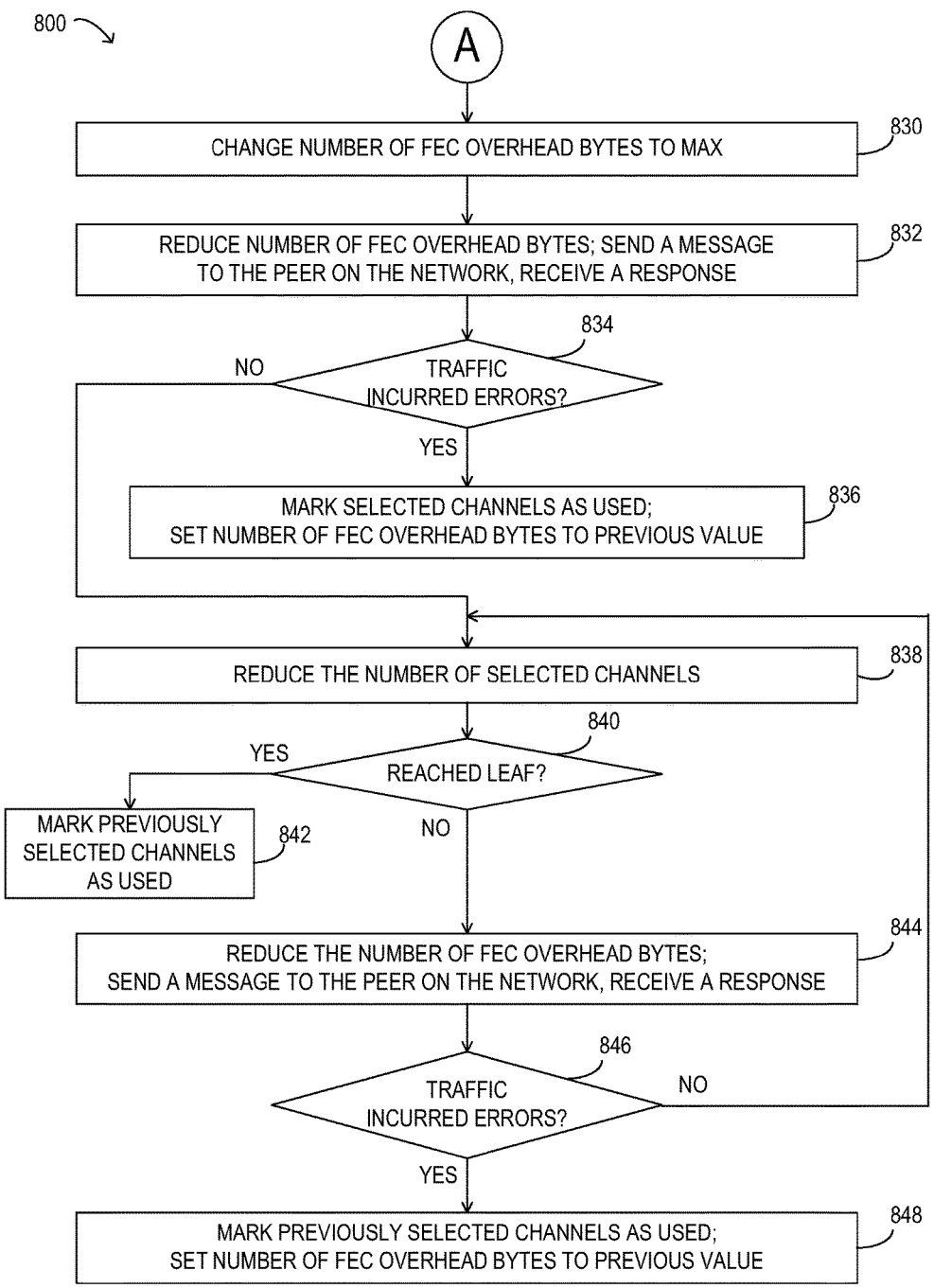

At step 406, the method may include tuning the FEC mechanism for the traffic between the transmitter and the receiver, selecting a non-zero number of FEC overhead bytes to be included in packets transmitted between the transmitter and the receiver. The selected non-zero number of FEC overhead bytes may be the lowest overhead FEC option with acceptable performance for a corresponding second number of channels that is less than the intermediate number of channels and for the selected second modulation format. Once the FEC mechanism has been selected and the corresponding second number of channels has been determined, the transmitter may be re-configured accordingly. For example, the transmitter may be configured to allocate the determined second number of channels to the traffic between the transmitter and the receiver and to set the number of FEC overhead bytes to be included in packets transmitted between the transmitter and the receiver to the selected non-zero number of FEC overhead bytes. One example method for tuning the FEC mechanism and potentially reducing the number of channels allocated to traffic between peers at a particular distance in an optical network is illustrated in FIGS. 8A and 8B, and described below.

Note that while FIG. 4 illustrates an example embodiment in which the modulation format is tuned first and the FEC mechanism is tuned afterward, in other embodiments, the FEC mechanism may be tuned first, followed by the tuning of the modulation format.

Figure 5:
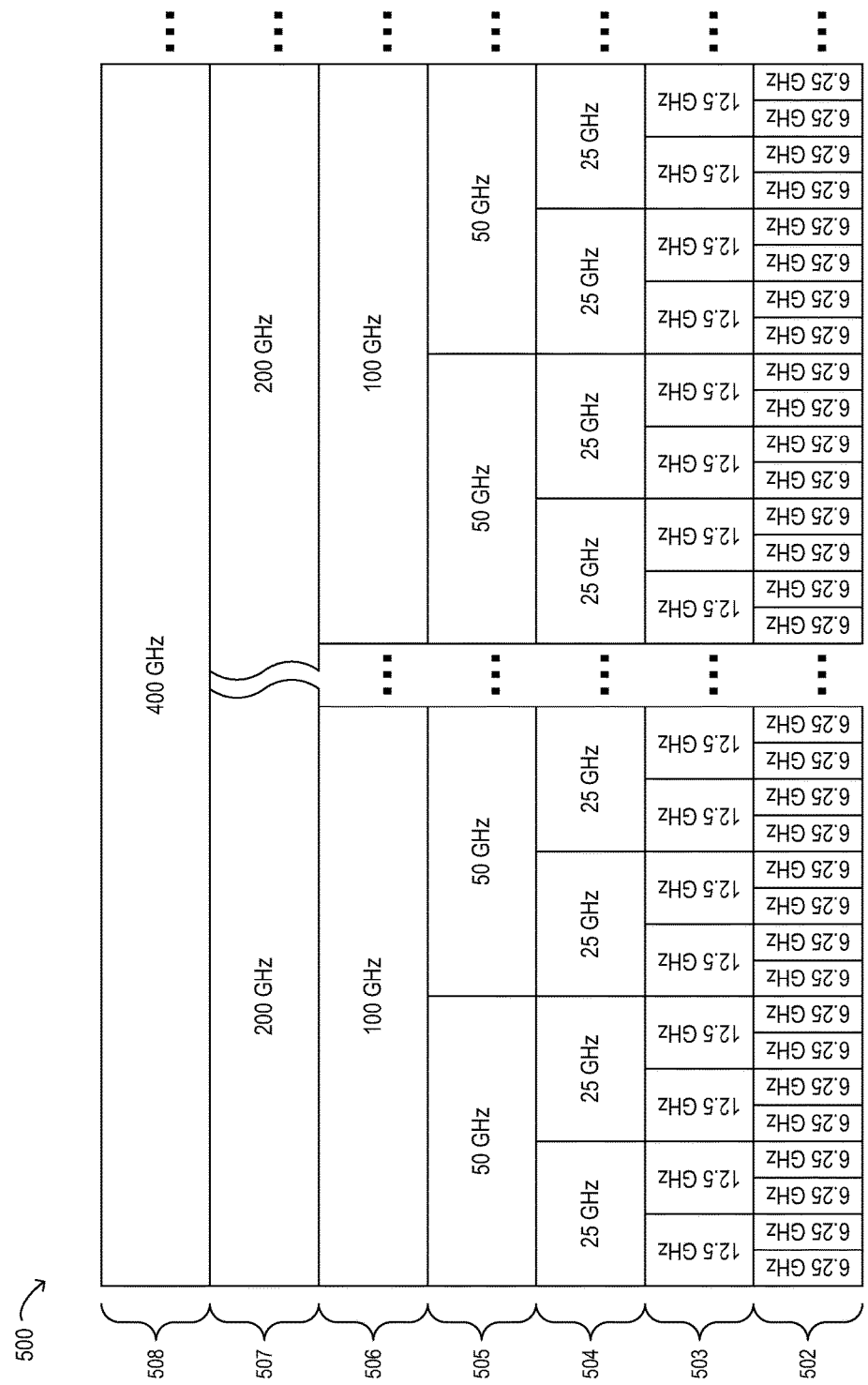
FIG. 5 illustrates a graphical representation of the division of the available spectral bandwidth in an optical network into slices of different sizes in a flexible grid, according to one embodiment.

FIG. 5 is a graphical representation 500 of the division of the available spectral bandwidth in an optical network into slices of different sizes in a flexible grid, according to one embodiment. In this example embodiment, which is simplified for clarity, the total available spectral bandwidth is 400 GHz, and is shown as a single channel in row 508.

Graphical representation 500 depicts multiple rows of flexible grid slices of increasing size. For example, the smallest available slices in the flexible grid, shown in row 502, have a spacing of 6.25 GHz. Therefore, there could be up to a maximum of 64 channels, each comprising a minimum sized slice of the spectral bandwidth, available to be allocated to traffic between two peers in the optical network. In practice, the total available spectral bandwidth of an optical network may be divided into many more channels, each comprising a minimum sized (e.g., 6.25 GHz) slice of the spectral bandwidth. In one example, the total available spectral bandwidth of an optical network operating in the C-band may be divided into 720 channels, each including a respective 6.25 GHz slice of the spectral bandwidth. It should be noted that the techniques described herein may also be used in optical networks operating in other wavelength bands (e.g., the O-band, E-band, S-band, or L-band). The number of channels into which the total available spectral bandwidth is divided may be dependent on both the minimum sized slice supported in the system and the wavelength band in which the optical network is operating. For example, in an embodiment in which the optical network is operating in the L-band, the number of channels into which the total available spectral bandwidth is divided may be much larger than the number of channels into which the total available spectral bandwidth is divided when operating in the C-band, assuming the same minimum sized slice.

Other options for dividing the spectral bandwidth into respective channels include, for example, dividing the spectral bandwidth into 32 channels each comprising a 12.5 GHz slice (shown in row 504), dividing the spectral bandwidth into 16 channels each comprising a 25 GHz slice (shown in row 506), dividing the spectral bandwidth into 8 channels each comprising a 50 GHz slice (shown in row 505), dividing the spectral bandwidth into 4 channels each comprising a 100 GHz slice (show in row 506), or dividing the spectral bandwidth into 2 channels each comprising a 200 GHz slice (shown in row 507). In some embodiments, channels of two or more different sizes may be allocated to the traffic between different pairs of peers in the optical network.

Referring now to FIG. 6, a block diagram of selected elements of an embodiment of method 600 for determining a first number of channels in a flexible grid to allocate to traffic between peers at a particular distance in an optical network, as described herein, is depicted in flowchart form. More specifically, FIG. 6 illustrates a method 600 for determining a minimum number of channels to be allocated between a transmitter (e.g., an optical transponder, such as coherent optical transmitter 210) and a peer (e.g., another optical transponder, such as coherent optical receiver 230) in an adaptive flexible grid based on a selected first modulation format and including no FEC overhead bytes in the packets transmitted between the transmitter and the peer. The method may be dependent on the minimum sized slice supported in the grid. In this example embodiment, method 600 may include repeatedly reducing the number of selected channels allocated to the traffic between the transmitter and the peer until the traffic incurs errors. At least certain operations in method 600 may be performed using an SDN controller, such as SDN controller 240 illustrated in FIG. 2 or SDN controller 900 (see also FIG. 9), based on performance feedback received from one or more transponders, such as coherent optical transmitter 210 and/or coherent optical receiver 230. For example, certain operations may be performed by adaptive flexible grid controller 930 executing on SDN controller 240 or SDN controller 900. It is noted that certain operations of method 600 illustrated in FIG. 6 may be optional or may be performed in a different order, in different embodiments.

Method 600 may begin at step 602 by setting, at a transmitter, the number of channels in a flexible grid of an optical network allocated to traffic between the transmitter and a peer on the optical network to the maximum number of available channels based on the minimum sized slice of the available spectral bandwidth in the optical network, setting the modulation format for the traffic to the minimum order modulation format supported on the transmitter, and disabling forward error correction by setting the number of FEC overhead bytes to zero.

At step 604, a message may be sent from the transmitter to the peer on the optical network, after which a response may be received from the peer. The response may include performance feedback including an indication of whether or not the message was received by the peer within errors.

At step 606, a determination of whether the traffic between the transmitter and the peer incurred errors may be made. The determination may be based on performance feedback included in the response from the peer. If so, the method may proceed to step 608. Otherwise, the method may proceed to step 610. At step 608, because it was not possible to select a suitable wavelength for the traffic between the transmitter and the peer, a fault may be returned. At step 610, the number of selected channels may be reduce, after which another message may be sent from the transmitter to the peer on the optical network and a response may be received from the peer. In some embodiments, the number of selected channels may be reduced by half. In particular embodiments, the number of selected channels may be reduced by an absolute amount or by a different percentage amount.

At step 612, a determination of whether the traffic between the transmitter and the peer incurred errors may be made. The determination may be based on performance feedback included in the response from the peer. If the traffic between the transmitter and the peer did not incur errors, step 610 may be repeated one or more times until it is determined that the traffic between the transmitter and the peer incurred errors. If (or once) it is determined that the traffic between the transmitter and the peer incurred errors, the method may proceed to step 614, where the number of selected channels is set to the previous value, and the selected channels are marked as used.

Referring now to FIG. 7, a block diagram of selected elements of an embodiment of method 700 for tuning the modulation format and potentially reducing the number of channels allocated to the traffic between peers at a particular distance in an optical network, as described herein, is depicted in flowchart form. More specifically, FIG. 7 illustrates a method 700 for changing the modulation format for the traffic between a transmitter (e.g., an optical transponder, such as coherent optical transmitter 210) and a peer (e.g., another optical transponder, such as coherent optical receiver 230) to a higher order modulation format and determining a corresponding intermediate reduced number of channels to be allocated between the peers, as described herein. At least certain operations in method 700 may be performed using an SDN controller, such as SDN controller 240 illustrated in FIG. 2 or SDN controller 900 (see also FIG. 9), based on performance feedback received from one or more transponders, such as coherent optical transmitter 210 and/or coherent optical receiver 230. For example, certain operations may be performed by adaptive flexible grid controller 930 executing on SDN controller 240 or SDN controller 900. It is noted that certain operations of method 700 illustrated in FIG. 7 may be optional or may be performed in a different order, in different embodiments.

Method 700 may begin at step 702, by determining a minimum number of channels to allocate to traffic between a transmitter and a peer at a particular distance from the transmitter in a flexible grid, and configuring the transmitter accordingly. For example, in some embodiments, the minimum number of channels may be determined for traffic using a first selected modulation format using a method similar to method 600 illustrated in FIG. 6.

At step 704, the modulation format may be changed to one having a higher order than the first selected modulation format and the number of selected channels may be reduced. In some embodiments, the modulation format may be changed to one having twice the order of the first selected modulation format. In general, however, the modulation format may be changed to any modulation format having a higher order than the first selected modulation format. In some embodiments, the number of selected channels may be reduced by half. In general, however, the number of selected channels may be reduced by any absolute amount or by a different percentage amount.

At step 706, a message may be sent from the transmitter to the peer on the optical network using the changed modulation format and the reduced number of selected channels, after which a response may be received from the peer.

At step 708, a determination of whether the traffic between the transmitter and the peer incurred errors may be made. The determination may be based on performance feedback included in the response from the peer. If the traffic between the transmitter and the peer did not incur errors, steps 704 and 706 may be repeated one or more times until it is determined that the traffic between the transmitter and the peer incurred errors. If (or once) it is determined that the traffic between the transmitter and the peer incurred errors, the method may proceed to step 710. At step 710, the modulation format may be set to the previous modulation format, and the selected channels may be marked as used. In some embodiments, in preparation for tuning the FEC mechanism, forward error correction may be enabled with the maximum number of FEC overhead bytes. For example, the transmitter may be re-configured to set the number of FEC overhead bytes for the traffic between the transmitter and the receiver to the largest supported number of FEC overhead bytes.

Referring now to FIGS. 8A and 8B, a block diagram of selected elements of an embodiment of method 800 for tuning the FEC mechanism and potentially reducing the number of channels allocated to traffic between peers at a particular distance in an optical network, as described herein, is depicted in flowchart form. More specifically, FIGS. 8A and 8B illustrate a method 800 for changing the FEC mechanism for the traffic between a transmitter (e.g., an optical transponder, such as coherent optical transmitter 210) and a peer (e.g., another optical transponder, such as coherent optical receiver 230) to increase the number of FEC overhead bytes and determining a corresponding second reduced number of channels to be allocated between the peers, as described herein. At least certain operations in method 800 may be performed using an SDN controller, such as SDN controller 240 illustrated in FIG. 2 or SDN controller 900 (see also FIG. 9), based on performance feedback received from one or more transponders, such as coherent optical transmitter 210 and/or coherent optical receiver 230. For example, certain operations may be performed by adaptive flexible grid controller 930 executing on SDN controller 240 or SDN controller 900. It is noted that certain operations of method 800 illustrated in FIG. 8 may be optional or may be performed in a different order, in different embodiments.

Method 800 may begin at step 802, by configuring a transmitter to allocate a minimum number of channels to traffic between the transmitter and a peer in a flexible grid of an optical network with a corresponding modulation format and including the maximum number of FEC overhead bytes in the transmitted packets. In some embodiments, the configuration of the transmitter may be performed using methods similar to method 600 illustrated in FIG. 6 and/or method 700 illustrated in FIG. 7.

At step 804, the number of selected channels may be reduced and a message may be sent from the transmitter to the peer on the optical network using the reduced number of selected channels, after which a response may be received from the peer. In some embodiments, the number of selected channels may be reduced by half. In general, however, the number of selected channels may be reduced by any absolute amount or by a different percentage amount.

At step 806, a determination of whether the traffic between the transmitter and the peer incurred errors may be made. The determination may be based on performance feedback included in the response from the peer. If so, the method may proceed to step 808. Otherwise, the method may proceed to step 810. At step 808, the previously selected channels may be marked as used and method 800 may be complete. For example, following step 808 the transmitter may be configured as described in step 802.

At step 810, the number of FEC overhead bytes may be changed to zero and a message may be sent from the transmitter to the peer on the optical network, after which a response may be received from the peer. Following step 810, method 800 may include attempting to tune the FEC mechanism by repeatedly increasing the number of FEC overhead bytes and reducing the number of selected channels allocated to the traffic between the transmitter and the peer until the traffic incurs errors.

At step 812, a determination of whether the traffic between the transmitter and the peer incurred errors may be made. The determination may be based on performance feedback included in the response from the peer. If so, the method may proceed to step 830 illustrated in FIG. 8B. Otherwise, the method may proceed to step 814. At step 814, the number of selected channels may be reduced and the number of FEC overhead bytes may be increased. In some embodiments, the number of selected channels may be reduced by half. In general, however, the number of selected channels may be reduced by any absolute amount or by a different percentage amount. In some embodiments, the FEC mechanism may be changed to double the number of FEC overhead bytes with each iteration. In general, however, the number of FEC overhead bytes may be increased by any absolute amount or by a different percentage amount.

At step 816, a determination may be made of whether, by reducing the number of selected channels, the method has reached a leaf of the flexible grid. If so, the method may proceed to step 818. Otherwise, the method may proceed to step 820. For example, if the most recently reduced number of selected channels comprises a leaf of the flexible grid, which includes the minimum supported number of channels that can be allocated to traffic between two peers in the optical network and corresponds to the smallest portion of the spectral bandwidth that can be allocated to the traffic between two optical transponders in the optical network, the number of selected channels cannot be further reduced. In some embodiments, the minimum supported number of channels that can be allocated to traffic between two peers in the optical network (i.e., the leaf size) may be one channel whose size equals the minimum sized slice of the available spectral bandwidth in the optical network. In other embodiments, the minimum supported number of channels that can be allocated to traffic between two peers in the optical network (or leaf size) may be two or more channels, each of whose size equals the minimum sized slice of the available spectral bandwidth in the optical network.

At step 818, the previously selected channels may be marked as used and the number of FEC overhead bytes may be set to the previous value. At step 820, a message may be sent from the transmitter to the peer on the optical network, after which a response may be received from the peer.

At step 822, a determination of whether the traffic between the transmitter and the peer incurred errors may be made. The determination may be based on performance feedback included in the response from the peer. If so, the method may proceed to step 830 illustrated in FIG. 8B. Otherwise, the method may return to step 814, where the number of selected channels may be further reduced and the number of FEC overhead bytes may be further increased.

At step 830 illustrated in FIG. 8B, the number of FEC overhead bytes may be changed to the maximum number of FEC overhead bytes. Following step 830, method 800 may include attempting to tune the FEC mechanism by repeatedly decreasing the number of FEC overhead bytes and increasing the number of selected channels allocated to the traffic between the transmitter and the peer until the traffic incurs errors.

At step 832, the number of FEC overhead bytes may be decreased and a message may be sent from the transmitter to the peer on the optical network, after which a response may be received from the peer. In some embodiments, the FEC mechanism may be changed to halve the number of FEC overhead bytes with each iteration. In general, however, the number of FEC overhead bytes may be decreased by any absolute amount or by a different percentage amount.

At step 834, a determination of whether the traffic between the transmitter and the peer incurred errors may be made. The determination may be based on performance feedback included in the response from the peer. If so, the method may proceed to step 836. Otherwise, the method may proceed to step 838.

At step 836, the selected channels may be marked as used and the number of FEC overhead bytes may be set to the previous value. At step 838, the number of selected channels may be reduced. In some embodiments, the number of selected channels may be reduced by half. In general, however, the number of selected channels may be reduced by any absolute amount or by a different percentage amount.

At step 840, a determination may be made of whether, by reducing the number of selected channels, the method has reached a leaf of the flexible grid. If so, the method may proceed to step 842. Otherwise, the method may proceed to step 844. At step 842, the previously selected channels may be marked as used and method 800 may be complete.

At step 844, the number of FEC overhead bytes may be further reduced and a message may be sent from the transmitter to the peer on the optical network, after which a response may be received from the peer.

At step 846, a determination of whether the traffic between the transmitter and the peer incurred errors may be made. The determination may be based on performance feedback included in the response from the peer. If the traffic between the transmitter and the peer did not incur errors, steps 838 to 846 may be repeated one or more times until it is determined that the traffic between the transmitter and the peer incurred errors.

If (or once) it is determined that the traffic between the transmitter and the peer incurred errors, the method may proceed to step 848. At step 848, the previously selected channels may be marked as used, the number of FEC overhead bytes may be set to the previous value, and method 800 may be complete.

As previously noted, software-defined networking represents an important step towards network virtualization and abstraction and may allow for a logical network entity to be instantiated automatically using software instructions, rather than manually from user input. An SDN controller, such as SDN controller 240 illustrated in FIG. 2, may support requests or demands for network services by configuring an optical network (or a portion thereof) for a particular bandwidth, packet or flow prioritization, route selection, or latency. In some embodiments, an SDN controller, such as SDN controller 240 illustrated in FIG. 2, may also be enabled to select the bare minimum number of channels for a given span between two peers/transponders in an optical network or for each of multiple pairs of peers/transponders, resulting in a more efficient use of the entire spectral bandwidth.

Figure 9:
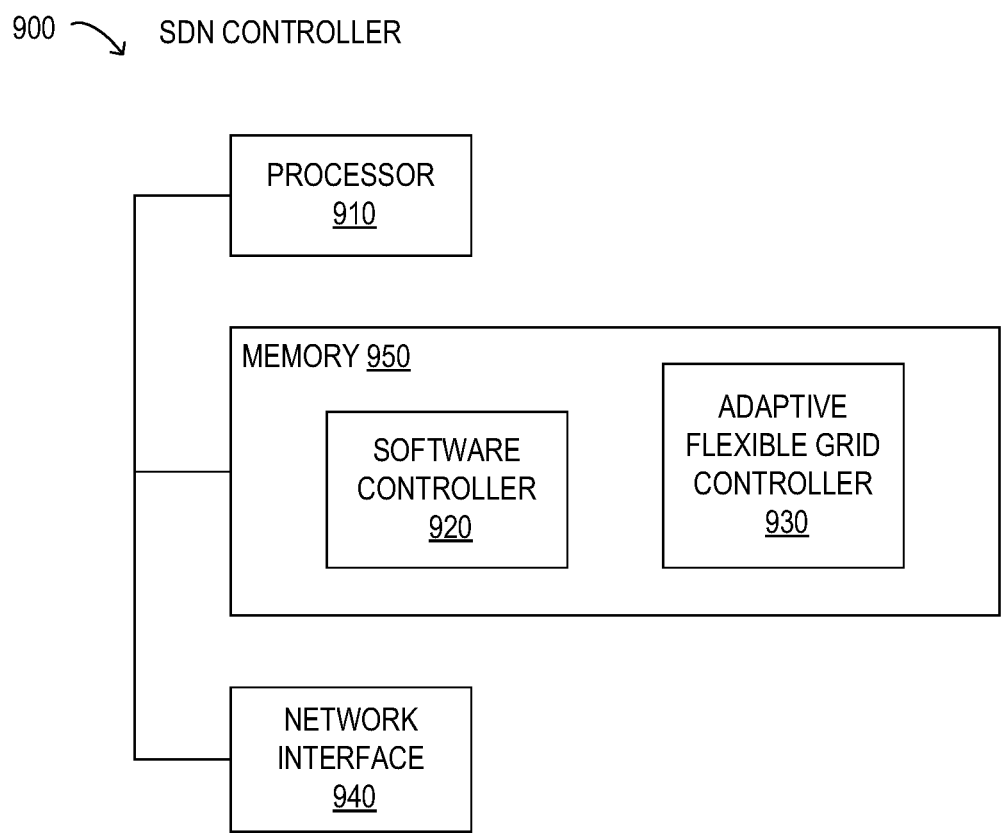
FIG. 9 is a block diagram of selected elements of an embodiment of a software-defined networking (SDN) controller.

Referring now to FIG. 9, a block diagram of selected elements of an embodiment of SDN controller 900 is illustrated. SDN controller 900 in FIG. 9 may be implemented to control and configure optical network 200 (see FIG. 2) and is a schematic diagram for descriptive purposes. SDN controller 900 may represent an embodiment of SDN controller 240.

In FIG. 9, SDN controller 900 is represented as a computer system including physical and logical components for controlling and configuring optical network 200, as described herein, and may accordingly include processor 910, memory 950, and network interface 940. Processor 910 may represent one or more individual processing units and may execute program instructions, interpret data, process data stored by memory 950 or SDN controller 900. It is noted that SDN controller 900 may be implemented differently in different embodiments. For example, in some embodiments, SDN controller 900 may be implemented using a network node. In particular embodiments, memory 950 may store executable instructions in the form of a software controller 920 executing on processor 910. For example, software controller 920 may include functionality for network intelligence and control and may comprise applications (or software modules) that support the ability to establish network services, including applications or modules for discovery, routing, path computation, and signaling. A discovery module may be responsible for discovery of neighbors and links between neighbors by sending discovery messages according to a discovery protocol, and receiving data about the optical signal transmission path. In some embodiments, the discovery module may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others. In embodiments in which the optical network is used to provide low cost, short reach, high speed data transmission (e.g. inter-data center transmission), topology discovery might not be necessary. For example, the optical signal transmission path may be a point-to-point linear optical link (i.e., a single link or span). The applications or modules that make up software controller 920 may work together to automatically establish services within the optical network in response to requests for service.

As shown, memory 950 may also store adaptive flexible grid controller 930, which may represent executable code stored in memory 950 to implement configuring a flexible grid in an optical network, including selecting a minimum number of channels to allocate to traffic between two peers in the network based on a tuning of the modulation format for the traffic and a tuning of the number of forward error correction overhead bytes included in packets transmitted between the two peers, as described herein. For example, adaptive flexible grid controller 930 may include instructions executable to perform any or all of the operations illustrated in FIGS. 4, 6, 7, 8A, and 8B, in certain embodiments.

In FIG. 9, memory 950 may be communicatively coupled to processor 910 and may comprise a system, device, or apparatus suitable to retain program instructions or data for a period of time (e.g., computer-readable media). Memory 950 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 950 may include different numbers of physical storage devices, in various embodiments. As shown in FIG. 9, memory 950 may include software controller 920 and adaptive flexible grid controller 930, among other applications or programs available for execution.

Some non-limiting examples of external applications that may be used with SDN controller 900 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Francisco, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

The systems and methods disclosed herein may be used to optimize channel selection in a flexible grid of an optical network. More specifically, these systems and methods address the selection and allocation of a minimum number of channels for traffic between pairs of optical transponders by tuning both the modulation format and the FEC mechanism used for the traffic and reducing the number of channels accordingly. In certain embodiments, the selection of channels for optimal spectrum utilization may be automated using these techniques. For example, the methods for selecting an initial number of channels in a flexible grid to allocate to traffic between two optical transponders in an optical network, tuning the modulation format for the traffic while potentially reducing the number of selected channels, and tuning the FEC mechanism for the traffic while potentially further reducing the number of selected channels may be implemented by an SDN controller based on a feedback mechanism between the two optical transponders. The SDN controller may make decisions regarding the selected number of channels to allocate to traffic between particular pairs of optical transponder prior to installing network services involving those transponders. The adaptive FEC mechanism described herein may use 0 to K bytes of overhead bytes where K is equal to the total number of data bytes in the transmitted packets.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for configuring a flexible grid in an optical network, comprising:
   determining a first number of channels in the flexible grid to allocate to traffic between a transmitter in the optical network and a receiver in the optical network using a first modulation format selected for the traffic and including zero forward error correction (FEC) overhead bytes in packets transmitted between the transmitter and the receiver;
   configuring the transmitter to allocate the first number of channels in the flexible grid to the traffic between the transmitter and the receiver and to transmit packets to the receiver using the first modulation format and zero FEC overhead bytes;
   determining a second number of channels in the flexible grid to allocate to the traffic between the transmitter and the receiver, the second number of channels being less than the first number of channels, the determining including:
      selecting a second modulation format for the traffic, the second modulation format being of a higher order than the first modulation format;
      selecting a first non-zero number of FEC overhead bytes to be included in packets transmitted between the transmitter and the receiver; and
      determining a minimum number of channels for which transmission of packets between the transmitter and receiver using the second modulation format and the first non-zero number of FEC overhead bytes meets a predetermined performance measure; and
   re-configuring the transmitter to allocate the second number of channels in the flexible grid to the traffic between the transmitter and the receiver and to transmit packets to the receiver using the second modulation format and including the first non-zero number of FEC overhead bytes.

2. The method of claim 1, wherein:
   the method further comprises selecting the first modulation format; and
   at least one of selecting the first modulation format and determining the first number of channels is dependent on the distance between the transmitter and the receiver.

3. The method of claim 1, wherein selecting the second modulation format for the traffic comprises, for at least one modulation format of a higher order than the first modulation format:
re-configuring the transmitter to allocate a number of channels less than the first number of channels and to transmit packets to the receiver using the modulation format of a higher order than the first modulation format;
transmitting a packet from the transmitter to the receiver; and
determining whether the transmitted packet was received by the receiver without errors.

4. The method of claim 1, wherein selecting the first non-zero number of FEC overhead bytes comprises, for at least one non-zero number of FEC overhead bytes:
re-configuring the transmitter to include the non-zero number of FEC overhead bytes in packets transmitted to the receiver;
transmitting a packet from the transmitter to the receiver; and
determining whether the transmitted packet was received by the receiver without errors.

5. The method of claim 1, wherein determining the minimum number of channels for which transmission of packets between the transmitter and receiver meets a predetermined performance measure comprises, for at least one number of channels less than the first number of channels:
re-configuring the transmitter to allocate the number of channels less than the first number of channels;
transmitting a packet from the transmitter to the receiver; and
determining whether the transmitted packet was received by the receiver without errors.

6. The method of claim 1, wherein:
each channel to be allocated to the traffic between the transmitter and the receiver comprises a minimum sized slice of available spectral bandwidth in the optical network.

7. The method of claim 6, wherein the minimum sized slice of available spectral bandwidth in the optical network is less than or equal to 6.25 GHz.

8. The method of claim 1, wherein the FEC overhead bytes comprise FEC overhead bytes of a Reed-Solomon error-correcting code.

9. A system for implementing an adaptive flexible grid in a software-defined network (SDN) for optical transport, the system comprising:
a plurality of optical transponders; and
an SDN controller, comprising a memory media and a processor having access to the memory media, wherein the memory media store instructions executable by the processor for:
determining a first number of channels in the flexible grid to allocate to traffic between a first transponder in the optical network and a second transponder in the optical network using a first modulation format selected for the traffic and including zero forward error correction (FEC) overhead bytes in packets transmitted between the first transponder and the second transponder;
configuring the first transponder to allocate the first number of channels in the flexible grid to the traffic between the first transponder and the second transponder and to transmit packets to the second transponder using the first modulation format and zero FEC overhead bytes;
determining a second number of channels in the flexible grid to allocate to the traffic between the first transponder and the second transponder, the second number of channels being less than the first number of channels, the determining including:
selecting a second modulation format for the traffic, the second modulation format being of a higher order than the first modulation format;
selecting a first non-zero number of FEC overhead bytes to be included in packets transmitted between the first transponder and the second transponder; and
determining a minimum number of channels for which transmission of packets between the first transponder and the second transponder using the second modulation format and the first non-zero number of FEC overhead bytes meets a predetermined performance measure; and
re-configuring the first transponder to allocate the second number of channels in the flexible grid to the traffic between the first transponder and the second transponder and to transmit packets to the second transponder using the second modulation format and including the first non-zero number of FEC overhead bytes.

10. The system of claim 9, wherein:
wherein the memory media further store instructions executable by the processor for selecting the first modulation format; and
at least one of selecting the first modulation format and determining the first number of channels is dependent on the distance between the first transponder and the second transponder.

11. The system of claim 9, wherein each of the first and second transponders is configured to support at least three modulation formats, including the first modulation format and the second modulation format.

12. The system of claim 9, wherein each of the first and second transponders is configured to support the inclusion of any of a plurality of non-zero numbers of FEC overhead bytes in packets transmitted by the transponder, including the first non-zero number of FEC overhead bytes and a maximum number of FEC overhead bytes equal to the number of data bytes in packets transmitted by the transponder.

13. The system of claim 9, wherein:
each channel to be allocated to the traffic between the first transponder and the second transponder comprises a minimum sized slice of available spectral bandwidth in the optical network.

14. The system of claim 9, wherein:
the first and second transponders are configured to communicate control information to each other according to a handshake protocol, the control information being communicated using control overhead bytes included in one or more packets exchanged between the first and second transponders or using an out-of-band channel for communicating control information in the optical network.

15. The system of claim 9, wherein:
the SDN controller resides in a control plane of the optical network;
to configure the first transponder to allocate the first number of channels in the flexible grid to the traffic between the first transponder and the second transponder and to transmit packets to the second transponder using the first modulation format and zero FEC overhead bytes, the SDN controller is configured to communicate first configuration information to the first transponder, the first configuration information including:
  information indicating the first number of channels and the first modulation format; and
  information indicating that forward error correction is to be disabled; and
to re-configure the first transponder to allocate the second number of channels in the flexible grid to the traffic between the first transponder and the second transponder and to transmit packets to the second transponder using the second modulation format and including the first non-zero number of FEC overhead bytes, the SDN controller is configured to communicate second configuration information to the first transponder, the second configuration information including:
  information indicating the second number of channels and the second modulation format; and
  information indicating that forward error correction is to be enabled and configured to include the first non-zero number of FEC overhead bytes in packets transmitted to the second transponder.

16. An optical transponder, comprising:
first circuitry to support at least three modulation formats;
second circuitry to support the inclusion of any of a plurality of non-zero numbers of forward error correction (FEC) overhead bytes in packets transmitted by the optical transponder, including a maximum number of FEC overhead bytes equal to the number of data bytes in packets transmitted by the optical transponder;
third circuitry to transmit packets to another optical transponder over one or more channels in a flexible grid in an optical network;
fourth circuitry to:
  receive first configuration information including:
    information indicating a first number of channels in the flexible grid to allocate to traffic between the optical transponder and the other optical transponder;
    information indicating a first modulation format with which packets are to be transmitted from the optical transponder to the other optical transponder; and
    information indicating that forward error correction is to be disabled for packets transmitted from the optical transponder to the other optical transponder; and
  receive second configuration information including:
    information indicating a second number of channels in the flexible grid to allocate to traffic between the optical transponder and the other optical transponder, the second number of channels being less than the first number of channels;
    information indicating a second modulation format with which packets are to be transmitted from the optical transponder to the other optical transponder, the second modulation format being of a higher order than the first modulation format; and
    information indicating that forward error correction is to be enabled and configured to include a first non-zero number of FEC overhead bytes in packets transmitted from the optical transponder to the other optical transponder; and
fifth circuitry to:
  configure the optical transponder to transmit packets to the other optical transponder in accordance with the first configuration information responsive to receipt of the first configuration information; and
  re-configure the optical transponder to transmit packets to the other optical transponder in accordance with the second configuration information responsive to receipt of the second configuration information.

17. The optical transponder of claim 16, further comprising:
sixth circuitry to:
  communicate first control information to the other optical transponder in accordance with a handshake protocol, the first control information being communicated using control overhead bytes included in one or more packets transmitted from the optical transponder to the other optical transponder or using an out-of-band communication channel for control information in the optical network, and the first control information indicating at least one of:
    the number of channels over which the optical transponder is configured to transmit packets to the other optical transponder;
    the modulation format with which packets are to be transmitted from the optical transponder to the other optical transponder; and
    the number of FEC overhead bytes to be included in packets transmitted from the optical transponder to the other optical transponder.

18. The optical transponder of claim 17, further comprising:
seventh circuitry to:
  receive feedback information from the other optical transponder in accordance with the handshake protocol, the feedback information indicating whether or not packets received by the other optical transponder were received without errors.

19. The optical transponder of claim 18, wherein:
the optical network comprises a software-defined network (SDN) for optical transport;
the fourth circuitry is configured to receive the first configuration information and the second configuration information from an SDN controller residing in a control plane of the optical network.

20. The optical transponder of claim 19, further comprising:
sixth circuitry to communicate second control information to the SDN controller indicating whether or not packets received by the other optical transponder were received without errors, the second control information being dependent on the feedback information received from the other optical transponder.

* * * * *